(12) United States Patent
Katsumoto et al.

(10) Patent No.: US 7,719,635 B2
(45) Date of Patent: May 18, 2010

(54) OPTICAL SHEET AND MANUFACTURING METHOD THEREOF, BACKLIGHT, LIQUID CRYSTAL DISPLAY

(75) Inventors: Ryuichi Katsumoto, Fujinomiya (JP);
Osamu Iwasaki, Minami-Ashigara (JP);
Makoto Koike, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 168 days.

(21) Appl. No.: 11/812,569

(22) Filed: Jun. 20, 2007

(65) Prior Publication Data

US 2008/0013323 A1    Jan. 17, 2008

(30) Foreign Application Priority Data

Jun. 21, 2006 (JP) ............... 2006-171495

(51) Int. Cl.
*G02F 1/1335* (2006.01)
(52) U.S. Cl. .............. 349/95; 359/831; 427/162
(58) Field of Classification Search ............ 349/95; 362/311, 620, 626; 359/831; 427/162
See application file for complete search history.

(56) References Cited

U.S. PATENT DOCUMENTS

| | | | | |
|---|---|---|---|---|
| 4,066,331 A | * | 1/1978 | Lindner | 359/514 |
| 5,706,132 A | * | 1/1998 | Nestegard et al. | 359/529 |
| 6,454,452 B1 | * | 9/2002 | Sasagawa et al. | 362/561 |
| 6,819,507 B2 | * | 11/2004 | Minoura et al. | 359/727 |
| 7,056,005 B2 | * | 6/2006 | Lee | 362/625 |
| 7,562,991 B2 | * | 7/2009 | Benson et al. | 359/530 |
| 2002/0154408 A1 | * | 10/2002 | Minoura et al. | 359/529 |
| 2009/0009686 A1 | * | 1/2009 | Obata et al. | 349/64 |

FOREIGN PATENT DOCUMENTS

| | | |
|---|---|---|
| CA | 2244439 C | 7/1993 |
| DE | 693 17 133 T2 | 9/1998 |
| EP | 0 556 606 A1 | 8/1993 |
| JP | 5-313004 A | 11/1993 |
| JP | 7-230002 A | 8/1995 |
| JP | 7-294709 A | 11/1995 |
| JP | 8-190806 A | 7/1996 |
| JP | 2005043611 A * | 2/2005 |

* cited by examiner

*Primary Examiner*—Ellen Kim
(74) *Attorney, Agent, or Firm*—Sughrue Mion, PLLC

(57) ABSTRACT

The present invention provides an optical sheet having one generally planar surface and composed of transmissive material, wherein on the other surface of the optical sheet, a concavo-convex pattern formed of a convex portion having a triangular top portion and a concave portion of a surface parallel to the one surface of the optical sheet is formed alternately in a generally parallel array.

6 Claims, 7 Drawing Sheets

OPTICAL SHEET AND MANUFACTURING METHOD THEREOF, BACKLIGHT, LIQUID CRYSTAL DISPLAY

BACKGROUND OF THE INVENTION

1. Field of the Invention

The present invention relates to an optical sheet and a manufacturing method thereof, a backlight, and a liquid crystal display, and in particular to an optical sheet without a sidelobe and having a wide field of view and a manufacturing method thereof, and a backlight and a liquid crystal display using the optical sheet.

2. Description of the Related Art

A display or TV monitor for a PC has changed from a conventional CRT to a planar display satisfying requirements of miniaturization and thinness, and especially, a liquid crystal display is one of the most widely used systems because of its long history in the market.

Because this liquid crystal display is not of a self-luminous type like an EL or plasma display, it includes a backlight composed of a light emitter on the back side thereof to enhance visibility. For this backlight, a type of a backlight called "edge light system" in which a light source such as a cold-cathode tube is disposed on one side or both sides thereof is said to be advantageous from the viewpoints of thinness, lightweight and electrical power saving, and has been widely used.

FIG. 1 shows a configuration of the backlight of the edge light system in a cross-section view. This backlight includes a light source 11 which is composed of a plurality of cold-cathode tubes 10 and a so-called "pseudo flat surface light source" in which light emitted from each of the plurality of cold-cathode tubes 10 is configured to be emitted from a surface on one side of the light source 11.

The light emitted from the cold-cathode tube 10 in the light source 11 is dispersed by a diffusing plate 12 and a diffusing sheet 13, and enters an optical sheet 14 which is a prism sheet having a function as a collection sheet. The incident light is refracted by an optical film, emitted with and the twisted angle irradiated to a liquid crystal panel not shown from behind.

However, the optical sheet 14, which is the prism sheet, has a triangular, prismatic and concavo-convex pattern formed continuously thereon, and accordingly, in the light which is emitted from the light source 11 and exits through the diffusing plate 12, the diffusing sheet 13 and the optical sheet 14, the sidelobe is produced to cause a problem of a narrow field of view of a panel, and light interference is generated to raise a problem of nonuniformity in luminance, presenting insufficient visibility of the panel. In order to solve these problems, Japanese Patent Application Laid-Open Nos. H 8-190806, H 7-294709, H 7-230002 and H 5-313004 have proposed that a shape of the triangular, prismatic and concavo-convex pattern of the optical sheet 14 which is the prism sheet is modified.

SUMMARY OF THE INVENTION

However, in the invention disclosed in Japanese Patent Application Laid-Open Nos. H 8-190806, H 7-294709, H 7-230002 and H 5-313004, a tip of a top portion of a convex portion and a groove bottom of a concave portion in a triangular, prismatic shape of the optical sheet 14 which is the prism sheet is rounded to improve a field of view, but, the production is complex, so that, upon manufacturing of such optical sheet 14 evenly, it may be said that a manufacturing cost is increased to be unreasonable for practical use.

The present invention was made with taking into consideration the aforementioned, and an object thereof is to provide an optical sheet having a wide field of view without an increase in a manufacturing cost and a manufacturing method of the same, and a backlight and a liquid crystal display using this optical sheet.

A first aspect of the present invention is an optical sheet having one generally planar surface and composed of transmissive material, characterized in that, on the other surface of the optical sheet, a concavo-convex pattern formed of a convex portion having a triangular top portion and a concave portion of a surface parallel to the one surface of the optical sheet is formed alternately in a generally parallel array.

A second aspect of the present invention is an optical sheet having one generally planar surface and composed of transmissive material, characterized in that, on the other surface of the optical sheet, a concavo-convex pattern formed of a convex portion having a quadrangular pyramid-shaped top portion and a concave portion of a surface parallel to the one surface of the optical sheet is formed alternately.

A third aspect of the present invention is an optical sheet composed of transmissive material, characterized in that, in a prism sheet in which, on one of surfaces, a concavo-convex pattern formed of a convex portion having a triangular top portion and a concave portion having a triangular valley bottom portion is formed alternately in a generally parallel array, the concave portion is filled with transmissive resin material.

A fourth aspect of the present invention is the optical sheet according to the third aspect, characterized in that the concavo-convex pattern is a prismatic, concavo-convex pattern.

A fifth aspect of the present invention is an optical sheet composed of transmissive material, characterized in that, in a prism sheet in which, on one of surfaces, a concavo-convex pattern formed of a convex portion having a quadrangular pyramid-shaped top portion and a concave portion having an inverted quadrangular pyramid-shaped valley bottom portion is formed alternately, the concave portion is filled with transmissive resin material.

A sixth aspect of the present invention is the optical sheet according to any of the third to fifth aspect, characterized in that a height of the resin material with which the concave portion in the prism sheet is filled, from the valley bottom of the concave portion is not greater than half of a difference of elevation between a tip of the convex portion and the valley bottom of the concave portion in the prism sheet.

A seventh aspect of the present invention is the optical sheet according to any of the third to sixth aspect, characterized in that a refractive index of the resin material has a value different from that of a refractive index of material constituting the prism sheet.

An eighth aspect of the present invention is a backlight, characterized in that a light source is disposed on the opposing side to the surface of the optical sheet according to any of the first to seventh aspect, on which the concavo-convex pattern is formed.

A ninth aspect of the present invention is a liquid crystal display, characterized in that a light source is disposed on the opposing side to the surface of the optical sheet according to any of the first to seventh aspect, on which the concavo-convex pattern is formed, and a liquid crystal panel is disposed on the side of the surface of the optical sheet on which the concavo-convex pattern is formed.

A tenth aspect of the present invention is a manufacturing method of an optical sheet composed of transmissive material, characterized by including, in a prism sheet in which, on one of surfaces, a prismatic concavo-convex pattern formed of a convex portion having a triangular convex portion and a concave portion having a triangular valley bottom portion is formed alternately in a generally parallel array, a coating step for coating, with radiation curable resin material, the surface on which the concavo-convex pattern is formed, and a radiation irradiation step for irradiating a radiation beam to the prism sheet coated with the radiation curable resin material.

An eleventh aspect of the present invention is a manufacturing method of an optical sheet composed of transmissive material, characterized by including, in a prism sheet in which, on one of surfaces, a prismatic concavo-convex pattern formed of a convex portion having a quadrangular pyramid-shaped convex portion and a concave portion having an inverted quadrangular pyramid-shaped valley bottom portion is formed alternately in a generally parallel array, a coating step for coating, with radiation curable resin material, the surface on which the concavo-convex pattern is formed, and a radiation irradiation step for irradiating a radiation beam to the prism sheet coated with the radiation curable resin material.

A twelfth aspect of the present invention is a manufacturing method of an optical sheet, characterized by including a pressing step for manufacturing a prism sheet by forming, on one surface of a planar, transparent sheet composed of transmissive material, a prismatic concavo-convex pattern formed of a convex portion having a triangular top portion and a concave portion having a triangular valley bottom portion alternately in a generally parallel array, a coating step for coating, with radiation curable resin material, the surface of the prism sheet on which the concavo-convex pattern is formed, and a radiation irradiation step for irradiating a radiation beam to the prism sheet coated with the radiation curable resin material.

A thirteenth aspect of the present invention is a manufacturing method of an optical sheet, characterized by including a pressing step for manufacturing a prism sheet by forming, on one surface of a planar, transparent sheet composed of transmissive material, a prismatic concavo-convex pattern formed of a convex portion having a quadrangular pyramid-shaped top portion and a concave portion having an inverted quadrangular pyramid-shaped valley bottom portion alternately in a generally parallel array, a coating step for coating, with radiation curable resin material, the surface of the prism sheet on which the concavo-convex pattern is formed, and a radiation irradiation step for irradiating a radiation beam to the prism sheet coated with the radiation curable resin material.

A fourteenth aspect of the present invention is the manufacturing method of an optical sheet according to any of the tenth to thirteenth aspect, characterized in that, in the prism sheet, a height of the concave portion of the prism sheet in which the radiation curable resin material is formed, from the valley bottom is not greater than half of a difference of elevation between a tip of the convex portion and the valley bottom of the concave portion in the prism sheet.

A fifteenth aspect of the present invention is a backlight, characterized in that a light source is disposed on the opposing side to the surface of the optical sheet manufactured by the manufacturing method of an optical sheet according to any of the tenth to fourteenth aspect, on which the concavo-convex pattern is formed.

A sixteenth aspect of the present invention is a liquid crystal display, characterized in that a light source is disposed on the opposing side to the surface of the optical sheet manufactured by the manufacturing method of an optical sheet according to any of the tenth to fourteenth aspect, on which the concavo-convex pattern is formed, and a liquid crystal panel is disposed on the side of the surface of the optical sheet on which the concavo-convex pattern is formed.

As described above, according to the optical sheet and the manufacturing method of the same according to the present invention, an optical sheet having a wide field of view without the sidelobe can be easily provided at low cost. Further, a backlight and a liquid crystal display having a wide field of view and higher visibility can be provided by using this optical sheet for a part of the backlight and the liquid crystal display.

DETAILED DESCRIPTION OF THE PREFERRED EMBODIMENTS

First, a principle of an optical sheet according to the present invention will be described.

Figure 2:
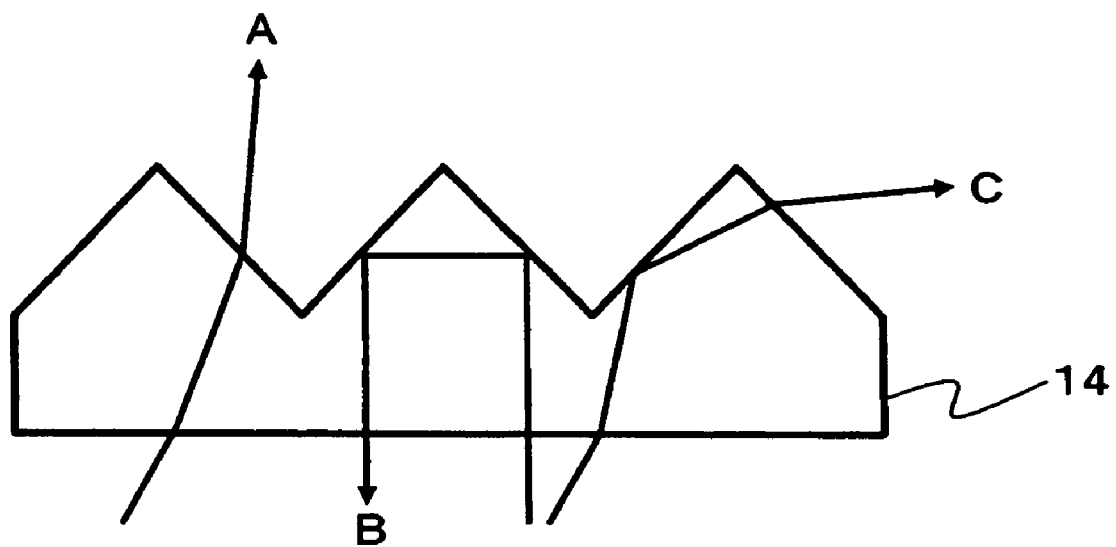
FIG. 2 is a cross-section view of a conventional prism sheet.

FIG. 2 is an enlarged cross-section view of an optical sheet 14 composed of a conventional prism sheet.

The optical sheet 14 composed of such prism sheet is formed of material having a high refractive index of about 1.6, and since the refractive index is higher than that of air, when a light beam enters the optical sheet 14 or exits, the light beam is refracted by an interface and therefore its traveling direction is angled.

Further, because the optical sheet 14, which is the prism sheet, is provided with a triangular, concavo-convex pattern having an apex angle in the range of 90 to 100°, an incident light beam may be largely angled, when it exits as an outgoing light beam. Now, referring to FIG. 2, the optical sheet 14 provided with the triangular, concavo-convex pattern having the apex angle of 90° will be described separately based on an angle of the incident light beam on the optical sheet 14 and an incident position thereof.

A component A of the incident light beam on the optical sheet 14, after entering the optical sheet 14, is refracted by an interface between a surface constituting prism surfaces of the triangular, prismatic and concavo-convex pattern provided on the outgoing side of the optical sheet 14 and air, exiting from the optical sheet 14 with its traveling direction being angled.

In this case, since the refractive index of the optical sheet 14 is about 1.6 and larger than that of air, the light beam exits so as to increase a light component for further enhancement of front luminance.

Next, a component B of the incident light beam on the optical sheet 14, after entering the optical sheet 14, is reflected by one surface constituting the prism surfaces of the prismatic, concavo-convex pattern provided on the outgoing side of the optical sheet 14, and subsequently, again reflected by the other surface constituting the prism surfaces, and then, the component B of the light beam goes back in the direction where a light source 11 is present. That is, in the case where the refractive index is 1.6 and the apex angle is 90°, the component B of the light beam is incident on the optical sheet 14 at nearly right angle, but it is incident at an angle of about 45° on this surface constituting the prism surfaces of the optical sheet 14. Therefore, the light beam incident on this surface is totally reflected by the interface, and totally reflected repeatedly, going back in the direction where the light source 11 is present. However, this light beam, subsequently, again enters the optical sheet 14 because its traveling direction is deflected by a diffusing sheet 13, a diffusing plate 12, a reflecting plate not shown and provided on the back side of the light source 11, and the like, and therefore, finally, the light beam turns into the component A of the light beam or a component C of the light beam described below and exits from the optical sheet 14.

Next, the component C of the incident light beam on the optical sheet 14, after entering the optical sheet 14, is totally reflected by one surface constituting the prism surfaces of the prismatic concavo-convex pattern provided on the outgoing side of the optical sheet 14, and subsequently, its traveling direction is angled due to refraction at the interface and it exits from the other surface.

The light beam emitted from a cold-cathode tube 10 in the light source 11 is nearly classified into three components of the light beam described above, and the light beam which, finally, is emitted from the optical sheet 14 in the direction where a liquid crystal panel exists is only the component A and the component C of the light beam. In the component A of the light beam, a perpendicular component to the optical sheet 14 is further enhanced due to the optical sheet 14, and in the component C of the light beam, a perpendicular component to the optical sheet 14 is weakened due to the optical sheet 14.

Figure 3:
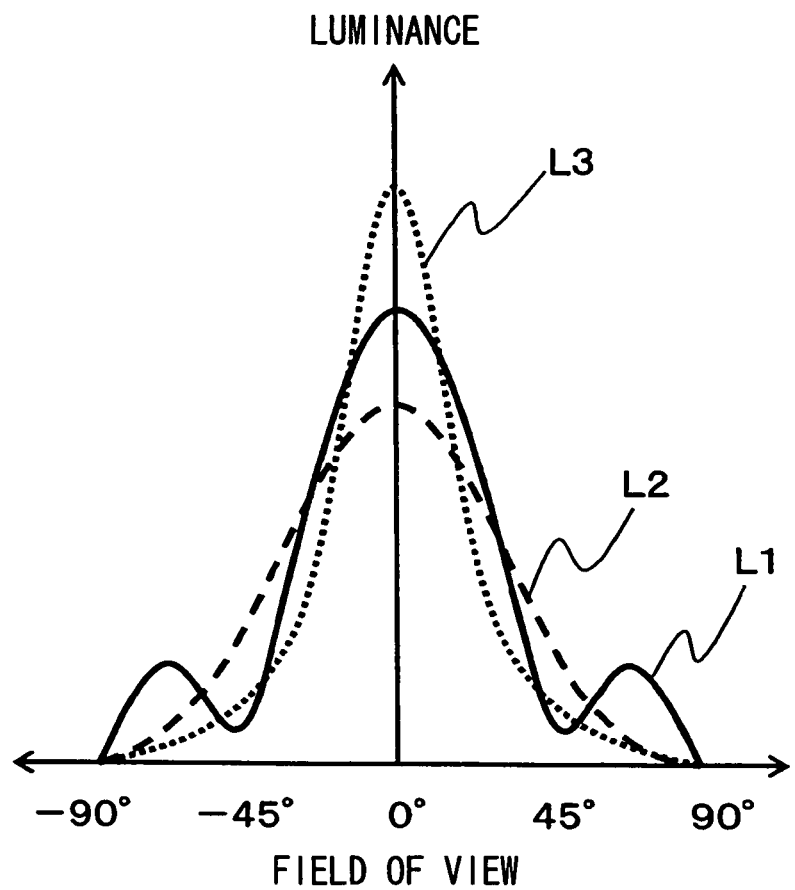
FIG. 3 is a schematic diagram illustrating correlation between a field of view and luminance in a backlight for a planar display.

FIG. 3 shows relation between the field of view and the luminance. A curve L1 shows correlation between the field of view and the luminance at the optical sheet 14 which is the prism sheet shown in FIG. 2. As described above, the optical sheet 14 shown in FIG. 2, in the case of the field of view of 0°, has comparatively high luminance, but as the field of view becomes larger, the luminance drops and reaches the lowest value at the field of view of about 45°, and subsequently, as the field of view becomes larger, the luminance, again, is increased, and therefore, the sidelobe is generated that the luminance becomes high at the field of view of about 70°.

This will be described based on the analysis result of the light components described above. The component A of the light beam described above serves to increase the luminance of the light beam within the field of view of 0° and a certain field of view among the incident light beam on the optical sheet 14. Further, because the optical sheet 14, which is the prism sheet, has an apex angle of 90°, the light beam, as described above, is scarcely emitted in the direction where the field of view is 45°. Therefore, the field of view in the case of using the optical sheet 14 falls within this.

On the contrary, the component C of the light beam is deflected by reflection and refraction at the interface in the direction where the field of view is larger than the incident angle on the optical sheet 14, and the component C of the light beam increases the luminance where the field of view is equal to or more than 45°. Therefore, the sidelobe is mainly formed by this component C of the light beam.

Accordingly, the conventional optical sheet 14, as the curve L1 shown in FIG. 3, exhibits the correlation curve between the field of view and the luminance having the sidelobe that the luminance is low at the field of view of 45° and high at the field of view of about 70°.

Figure 4:
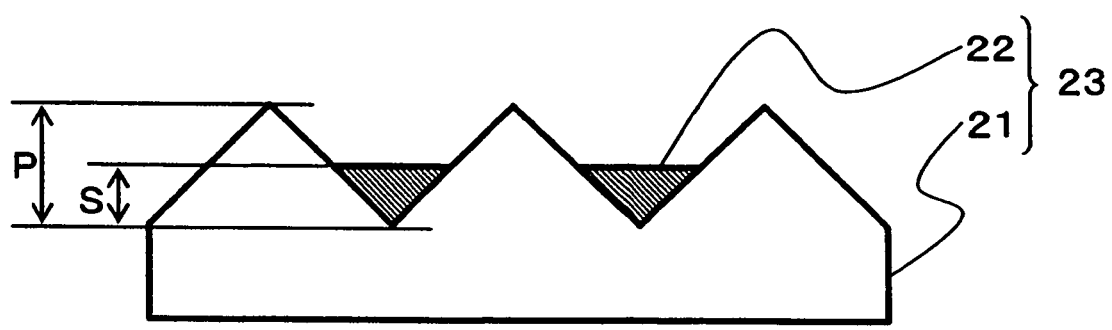
FIG. 4 is a cross-section view of an optical sheet according to the present invention.

As remarked above, the present inventors analyzed the optical sheet 14 which is the prism sheet conventionally used, and as a result, we have hit on an optical sheet having a wide field of view without the sidelobe generated, and easily manufactured, i.e. an optical sheet 23 according to the present invention in which a valley bottom portion of a concave portion in a prism sheet 21 shown in FIG. 4 is filled with a resin portion 22 of resin material.

Now, a first embodiment of the present invention will be described hereinafter.

[Optical Sheet]

Figure 5:
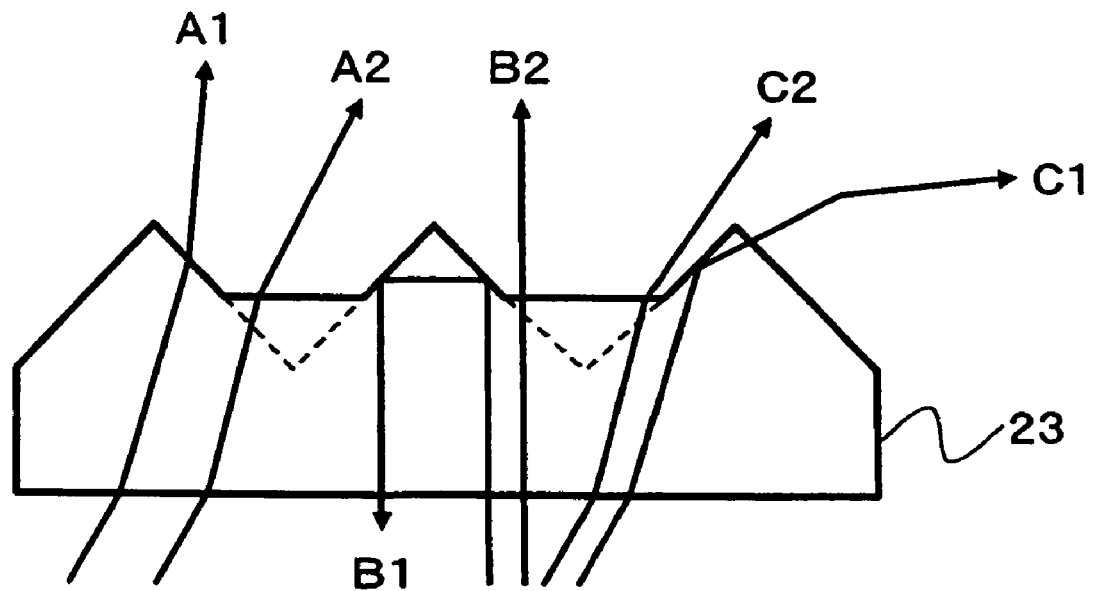
FIG. 5 is a schematic diagram illustrating function of an optical sheet according to the present invention.

For the optical sheet 23 according to the present invention shown in FIG. 4, FIG. 5 shows the optical sheet 23 having the same refractive index of the resin portion 22 for filling the valley bottom portion of the concave portion as that of the prism sheet 21. A light beam for this optical sheet 23 will be described based on components of the light beam similarly to FIG. 2.

The component A of the incident light beam on the conventional optical sheet 14 in FIG. 2, in the case of the optical sheet 23 shown in FIG. 5, is divided into a component A1 and a component A2 of the light beam depending on an incident position, even if the light beam is incident on the optical sheet 23 by the same angle. The component A1 of the light beam, similarly to the case shown in FIG. 2, is refracted by an interface between a surface constituting the prism sheet 21 having a prismatic, concavo-convex pattern provided on the optical sheet 23 and air, and exits with its traveling direction being angled. In this case, because the refractive index of the optical sheet 23 is larger than that of air, the component A1 of the light beam exits so as to increase a light component for further enhancement of the front luminance.

On the contrary, the component A2 of the light beam, as shown in FIG. 5, is refracted by an interface between a surface of the resin portion 22 composed of radiation curable resin material for covering the valley bottom portion of the concave portion which was the prism sheet 21 in the optical sheet 23 and air, and exits with its traveling direction being angled. In this case, because the refractive index of the resin portion 22 composed of the radiation curable resin material is larger than that of air, the component A2 of the light beam exits so as to decrease a light component for enhancement of the front luminance. However, because an angle by which the traveling direction is angled is not much large, the component A2 of the light beam, together with the component A1, is used as a light beam to enhance visibility by irradiating the liquid crystal panel from behind.

Now, the component A1 and the component A2 of the light beam are differently angled at the optical sheet 23, even if incident angles on the optical sheet 23 both are the same. It is because the interface between the optical sheet 23 and air is different in conditions. That is, because the refractive index of the optical sheet 23 is larger than that of air, the component A1 and the component A2 of the light beam, both have the same angle of refraction at the interface between the optical sheet 23 and air when the light beam exits. Therefore, measured in an angle relative to a nominal line perpendicular to the interface, an angle of the outgoing light beam is more enlarged than an angle of the incident light beam due to refraction. However, for the component A1 and the component A2 of the light beam, their interfaces on the outgoing side of the optical sheet 23 in their light paths have a different angle from each other, and therefore, they are emitted from the optical sheet 23 differently in the direction.

Next, the component B of the incident light beam on the conventional optical sheet 14 in FIG. 2, in the case of the optical sheet 23 shown in FIG. 5, is divided into a component B1 and a component B2 of the light beam depending on an incident position, even if the light beam is incident on the optical sheet 23 by the same angle (i.e. an angle perpendicular or generally perpendicular to an incident surface of the light beam on the optical sheet 23). The component B1 of the light beam, similarly to the case shown in FIG. 2, is totally reflected by the interface between one of surfaces constituting the prism sheet 21 having the triangular, concavo-convex pattern formed on the optical sheet 23 and air, and subsequently, again, totally reflected by the other surface of the surfaces constituting the prism sheet 21, going back in the direction where the light beam came. However, subsequently, this light beam enters the optical sheet 23, because its traveling direction again is angled by the diffusing sheet, the diffusing plate and the reflecting plate provided on the back side of a light guiding body, and therefore, finally, this light beam turns into a component of the light beam other than the component B1 and exits from the optical sheet 23.

On the contrary, the component B2 of the light beam, as shown in FIG. 5, is scarcely reflected by the interface between the resin portion 22 composed of the radiation curable resin material for covering the valley bottom portion of the concave portion which was the prism sheet 21 in the optical sheet 23 and air, passing through. In this case, reflection by the interface between the optical sheet 23 and air is somewhat present, but refraction scarcely has an effect, and therefore the light beam exits with scarcely deflected.

As remarked above, the component B2 of the light beam is emitted from the liquid crystal panel in a light beam having a field of view of near 0° and scarcely subjected to loss of a light volume due to reflection like the component B1 of the light beam. Further, the light volume of the component B1 of the light beam is lost due to reflection, but finally, it, together with the component B2, is used as a light beam to irradiate the liquid crystal panel from behind to enhance visibility.

Next, the component C of the incident light beam on the conventional optical sheet 14 in FIG. 2, in the case of the optical sheet 23 shown in FIG. 5, is divided into a component C1 and a component C2 of the light beam depending on an incident position, even if the light beam is incident on the optical sheet 23 by the same angle. The component C1 of the light beam, similarly to the case shown in FIG. 2, is totally reflected by the interface between one surface of surfaces constituting the prism sheet 21 having the triangular, concavo-convex pattern formed on the optical sheet 23 and air, and subsequently, its traveling direction is angled due to refraction at an interface between the other surface and air, and it exits.

On the contrary, the component C2 of the light beam passes through in a light path similar to the component A2 of the light beam described above, exiting from the optical sheet 23.

As remarked above, in the conventional optical sheet 14 shown in FIG. 2, a light beam having the field of view of about 45° is scarcely emitted, and a light beam having the field of view about 70° composed of the component C of the light beam is emitted, and thereby, the sidelobe is generated. However, in the optical sheet 23 according to the present invention shown in FIG. 5, such sidelobe is scarcely generated.

That is, in the optical sheet 23 according to the present invention shown in FIG. 5, because, in their own light path of the components A2 and C2 of the light beam, the interface of an incident area of the light beam on the optical sheet 23 and the interface of an outgoing area is generally parallel to each other, respectively, they exit from the optical sheet 23 by the same angle as the incident angle on the optical sheet 23. Therefore, the light beam incident on the optical sheet 23 by 45° exits by 45°. As long as an incident light beam does not satisfy conditions for total reflection about angle, an outgoing light beam from the optical sheet 23 in such way exits by such angle. In addition, when the conditions for total reflection are satisfied, a light beam passes through in the light path of the components B1 and C1 of the light beam.

Further, since the component C of the light beam in FIG. 2, in the case of the optical sheet 23 according to the present invention shown in FIG. 3, is divided into the components C1 and C2 of the light beam, a light beam proceeding to the direction of the field of view of about 70° is decreased, and thereby, the luminance in an area having the field of view with a high value is lower, compared to the case of FIG. 2.

Therefore, the sidelobe generated in the conventional optical sheet 14 of FIG. 2, in the optical sheet 23 according to the present invention shown in FIG. 5, can be reduced or eliminated the sidelobe. Specifically, correlation between the field of view and the luminance of the optical sheet 23 shown in FIG. 5 is shown by a curve L2 in FIG. 3.

Figure 6:
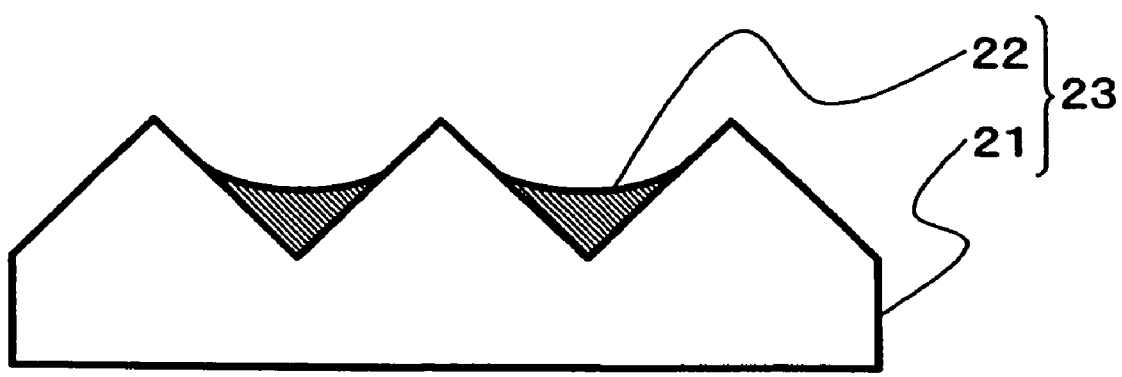
FIG. 6 is a cross-section view of an optical sheet of another embodiment according to the present invention.

In the above description, it is supposed that, upon coating, the radiation curable resin material do not have the viscosity and the surface tension, and an ideal optical sheet 23 has been described. However, in fact, the radiation curable resin material to be coated has no small viscosity and surface tension. Therefore, due to wettability to a surface of the prism sheet 21 to be coated or the like, in the optical sheet 23, as shown in FIG. 6, the resin portion 22 composed of the radiation curable resin material more covers the surface of the prism sheet 21, that is, the resin portion 22 is formed to be dented in the central portion. Therefore, the component C1 of the light beam in the optical sheet 23 is further reduced, and thereby, the sidelobe can be more decreased.

Until now, the case where the refractive index of the resin portion 22 composed of the radiation curable resin material is the same as that of material constituting the prism sheet 21 to be coated has been described. In addition, when the refractive index of the resin portion 22 of the radiation curable resin material is different from that of the material constituting the prism sheet 21 to be coated, adjusting a difference value between the refractive index of the resin portion 22 composed of the radiation curable resin material and that of the material constituting the prism sheet 21, and adjusting a height of the resin portion 22 by adjusting a quantity of the radiation curable resin material for filling the valley bottom portion of the prism sheet 21 can further reduce the sidelobe.

Further, in the optical sheet 23 according to the present invention shown in FIG. 5, the component A2 of the light beam less contributes to the luminance in a region of the field of view of about 0°, but the component B2 of the light beam more contributes to the luminance in the region of the field of view of about 0°. Adjusting the refractive index of the radiation curable resin material for forming the resin portion 22, and the height of the resin portion 22 by adjusting the quantity of the radiation curable resin material for filling the valley bottom portion of the prism sheet 21 can further enhance the luminance in the region of the field of view of about 0°, that is, as shown by a curve L3 in FIG. 3, the optical sheet 23 having no sidelobes and higher front luminance can be provided.

[Material and Manufacturing Method of Optical Sheet]

Next, material and a manufacturing method for forming the optical sheet 23 according to the present invention will be described.

A method for manufacturing the prism sheet 21 for manufacturing the optical sheet 23 according to the present invention may be any methods, as long as they can form the prism sheet 21 having the small, concavo-convex pattern as shown in FIG. 5, and the manufacturing method is not limited.

For example, there is a manufacturing method that sheet-like resin material extruded from a die is pressed by sandwiching between a transfer roller (having an the concavo-convex pattern formed on the prism sheet 21 and its inverted pattern formed on its surface) rotating at the nearly same speed as an extrusion speed of this resin material and a nip roller plate disposed opposite to this transfer roller and rotating at the same speed to transfer the concavo-convex pattern on the surface of the transfer roller to the resin material, manufacturing the prism sheet 21.

Alternatively, there is a manufacturing method of the prism sheet 21 by press forming in that a transfer template (stamper) in which a concavo-convex pattern to be formed on and its the inverted pattern the prism sheet 21 is formed on its surface and a resin plate are laminated by a hot press to thermally transfer.

Further, there also is a manufacturing method of the prism sheet 21 by injection molding in which a plate mold of a concavo-convex pattern to be formed on the prism sheet 21 and its the inverted pattern is used.

Resin material used in the manufacturing methods described above for forming the prism sheet 21 includes thermoplastic resin. Specifically, polymethyl methacrylate resin (PMMA), polycarbonate resin, polystyrene resin, MS resin, AS resin, polypropylene resin, polyethylene resin, polyethylene terephthalate resin, polyvinyl chloride resin (PVC), cellulose acylate, cellulose triacetate, cellulose acetate propionate, cellulose diacetate, thermoplastic elastomer, or copolymers of these, and cycloolefin polymer etc. can be used.

Also, another manufacturing method is a manufacturing method of the prism sheet 21 in which the concavo-convex pattern is transferred to and formed on a surface of a transmissive film by using a concavo-convex roller (on its surface, a concavo-convex pattern to be formed on the prism sheet 21 and its the inverted pattern is formed). Specifically, the manufacturing method of the prism sheet 21 is such that an adhesive layer and a resin layer (for example, UV curable resin) are formed by coating adhesive agent and resin in series on the surface of the transmissive film, and this transmissive film is wound around a concavo-convex roller rotating to be continuously fed, and thereby, the concavo-convex pattern formed on the surface of the concavo-convex roller is transferred to the resin layer, and then the resin layer is cured (for example, by irradiating an UV beam) with the transmissive film being wound around the concavo-convex roller, forming the prism sheet 21.

In addition, it is not necessary to apply the adhesive layer, when the resin layer well adheres to the transmissive film. In addition, a method for improvement of adherence includes a method that a primer layer is coated on the surface of the transmissive film, a method by activation processing such as corona treatment and the like, and therefore, especially, the method is not limited, as long as it may improve adherence.

Alternatively, there also is a method that resin material (for example, UV curable resin) is coated on a concavo-convex roller on which the inverted pattern to the concavo-convex pattern to be formed on the prism sheet 21 is formed, and a transmissive film continuously fed is sandwiched between the concavo-convex roller and a nip roller to adhere the resin material on the concavo-convex roller to the transmissive film, and subsequently, curing the resin material (for example, by UV irradiation). In order to improve adherence between the resin material and the transmissive film, the method by providing the adhesive layer described above etc. may be used.

For the transmissive film (support medium), a resin film may be used. Specifically, material of the resin film may include polyethylene, polypropylene, polyvinyl chloride, polyvinylidene chloride, polyvinyl acetate, polyester, polyolefin, acrylic, polystyrene, polycarbonate, polyamide, PET (polyethylene terephthalate), biaxial oriented polyethylene terephthalate, polyethylene naphthalate, polyvinyl naphthalene, polyamide-imide, polyimide, aromatic polyamide, cellulose acylate, cellulose triacetate, cellulose acetate propionate, cellulose diacetate and the like. Among them, especially, polyester, cellulose acylate, acrylic, polycarbonate and polyolefin are preferable. The resin material used, especially, is not limited, but material having a high refractive index is preferable from the viewpoint of improvement of the front luminance, and specifically, the material may include an aromatic ring structure such as a benzene ring and a naphthalene ring, and an organic compound containing a high level of halogen and sulfur such as Br and Cl.

When UV curable resin is used, resin which includes the structure described above, and, further, is mixed with a compound containing a reactive group such as a (meth)acroyl group, a vinyl group and an epoxy group, and a compound for generating active species such as a radical and a cation and capable of reacting the compound containing the reactive group above by radiation exposure of an ultraviolet beam etc. may be used. Especially, from the viewpoint of cure speed, a combination of a compound (monomer) containing a reactive group having an unsaturated group such as a (meth)acroyl group and a vinyl group, and a light-radical polymerization initiator for generating a radical due to light is preferable.

A compound containing a (meth)acroyl group may include phenoxyethyl (meth)acrylate, phenoxy-2-methylethyl (meth)acrylate, phenoxy ethoxyethyl (meth)acrylate, 3-phenoxy-2-hydroxypropyl (meth)acrylate, 2-phenyl phenoxyethyl (meth)acrylate, 4-phenyl phenoxyethyl (meth)acrylate, 3-(2-phenyl phenyl)-2-hydroxypropyl (meth)acrylate, (meth)acrylate of p-cumylphenol having ethylene oxide reacted, ethylene oxide added bisphenol A (meth)acrylic ester, propylene oxide added bisphenol A (meth)acrylic ester, bisphenol A epoxy (meth)acrylate derived from epoxy ring-opening reaction of bisphenol A diglycidyl ether and (meth)acrylic acid, bisphenol F epoxy (meth)acrylate derived from epoxy ring-opening reaction of bisphenol F diglycidyl ether and (meth)acrylic acid, and the like.

For a compound containing a (meth)acroyl group having a higher refractive index, a compound in which a halogen group of Br and Cl is substituted in an aromatic ring is used. An unsaturated monomer having such structure may include ethylene oxide added tetrabromobisphenol A (meth)acrylic ester, propylene oxide added tetrabromobisphenol A (meth)acrylic ester, tetrabromobisphenol A epoxy (meth) acrylate derived from epoxy ring-opening reaction of tetrabromobisphenol A diglycidyl ether and (meth)acrylic acid, tetrabromobisphenol F epoxy (meth)acrylate derived from epoxy ring-opening reaction of tetrabromobisphenol F diglycidyl ether and (meth)acrylic acid, 2-bromophenoxy ethyl (meth) acrylate, 4-bromophenoxy ethyl (meth) acrylate, 2,4-dibromophenoxy ethyl (meth)acrylate, 2,6-dibromophenoxy ethyl (meth)acrylate, 2,4,6-tribromophenyl (meth)acrylate, 2,4,6-tribromophenoxy ethyl (meth)acrylate, and the like.

Further, the refractive index of the resin material can also be increased by including inorganic fine particle material having a high refractive index. Such inorganic material having a high refractive index may include $TiO_2$ (refractive index: 2.2 to 2.7), $CeO_2$ (refractive index: 2.2), $ZrO_2$ (refractive index: 2.1), $In_2O_3$ (refractive index: 2.0), $La_2O_3$ (refractive index: 1.95), $SnO_2$ (refractive index: 1.9), $Y_2O_3$ (refractive index: 1.82), $Sb_2O_5$ (refractive index: 1.7), and the like. Further, because, as the fine particle has a smaller particle size, transparency of the resin material becomes higher, the particle size is preferably not greater than 100 nm, more preferably not greater than 50 nm, and further more preferably not greater than 20 nm. These inorganic fine particle materials with a high refractive index can be mixed with normal UV curable resin to be used, and therefore the refractive index of the UV curable resin can be more increased by mixing them with the UV curable resin having a high refractive index as described above.

Next, in the prism sheet 21 having the triangular, concavo-convex pattern formed thereon, manufactured according to the processes described above, resin material used to form the resin portion 22 for providing the optical sheet 23 according to the present invention will be described.

The resin material for forming the resin portion 22, especially, is not limited, as long as it has a predetermined refractive index, and physical properties such as a viscosity sufficient for allowing the valley bottom portion of the concave portion to be filled. Specifically, polymethyl methacrylate resin (PMMA), polycarbonate resin, polystyrene resin, MS resin, AS resin, polypropylene resin, polyethylene resin, polyethylene terephthalate resin, polyvinyl chloride resin (PVC), and resin of cellulose acylate, cellulose triacetate, cellulose acetate propionate, cellulose diacetate, thermoplastic elastomer, or copolymers of these, a cycloolefin polymer, or the like may be diluted with solution to be cast into the concave portion, and subsequently, evaporating the solution. Alternatively, UV curable resin etc. may be cast into the concave portion and subsequently cured by irradiation of an UV beam.

A method for casting into the concave portion may include a method that liquid for forming material for filling the valley bottom portion of the concave portion above is thinly coated entirely on the prism sheet 21 to be cast into the valley bottom portion of the concave portion, or a method that, using a dispenser etc., the liquid is cast into the valley bottom portion of the concave portion by each line, and it may be any methods capable of filling the valley bottom portion of the concave portion to a desired depth.

Also, a light diffusing function can be added to the optical sheet 23 formed. A method for adding the light diffusing function may include, for example, a method by including light diffusing substance in the optical sheet 23. Alternatively, a method by including light diffusing particles of beads etc. in the optical sheet 23, a method by kneading and mixing resin having a different refractive index and a method by including air, hollow beads and the like may be listed. Further, there may be listed a method for adding the light diffusing function that random roughness is provided on a surface of the optical sheet 23 by applying a method by adhering beads to the surface of the optical sheet 23, a method by roughening the surface of the optical sheet 23 using a blast process such as sandblasting on the surface or a plasma process, or a method that the surface of the optical sheet 23 is impregnated with solution for melting the optical sheet 23 to be melted.

[Specific Manufacturing Method of Optical Sheet]

Next, a specific manufacturing method of the optical sheet 23 according to the present invention will be described with reference to FIG. 7.

Figure 7:
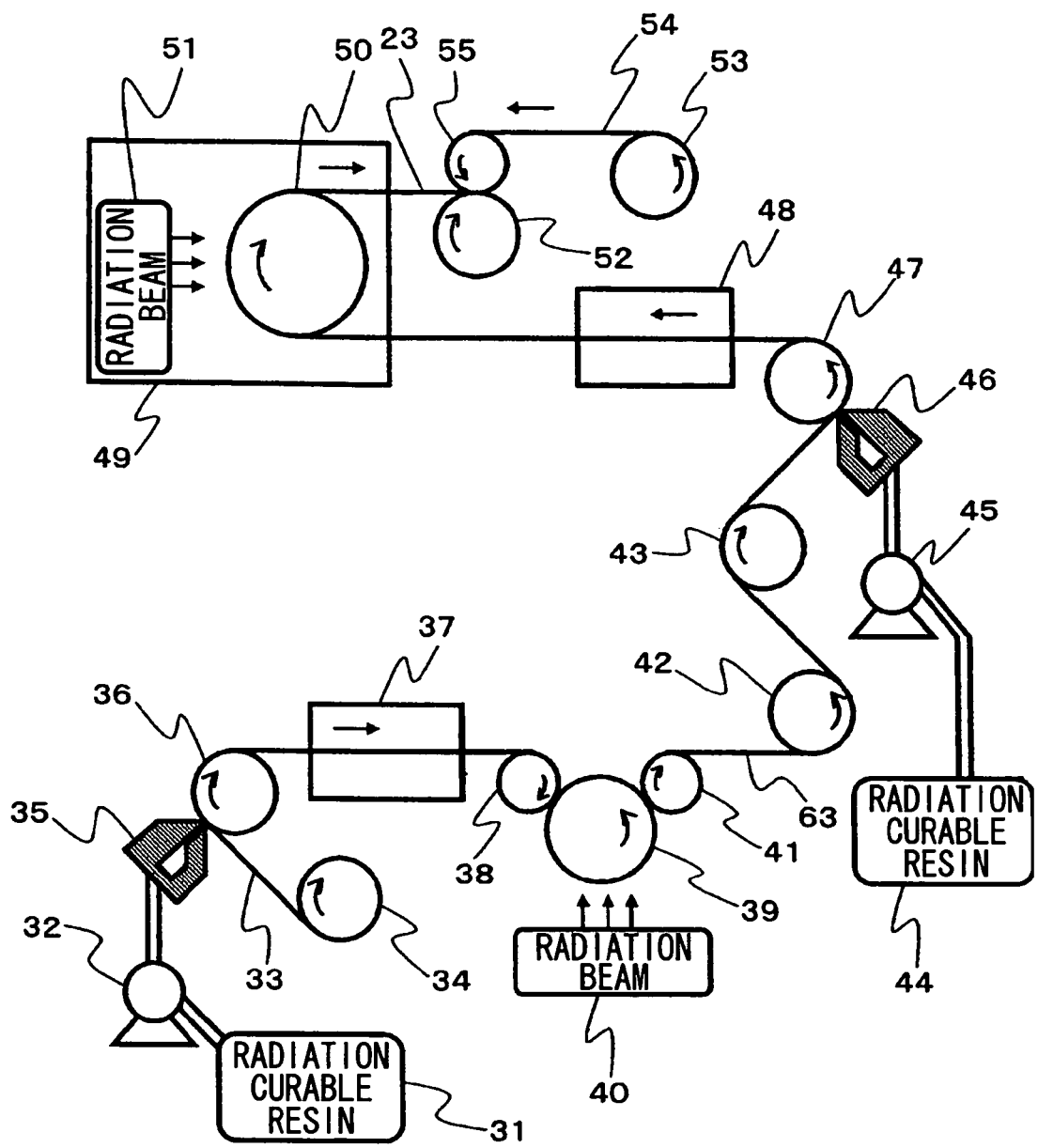
FIG. 7 is a schematic diagram illustrating a configuration of manufacturing equipment of an optical sheet according to the present invention.

FIG. 7 shows a configuration of manufacturing equipment for manufacturing the optical sheet 23 according to the present invention. A transparent sheet 33 used for manufacturing the optical sheet 23 according to the present invention is a transmissive film of transparent PET (polyethylene terephthalate) having a width of 500 (mm) and a thickness of 100 (μm). The transparent sheet 33 is fed at a constant speed from a sheet supply device 34.

The transparent sheet 33 fed at the constant speed in this way is coated with resin liquid. For the resin liquid to be coated, radiation curable resin material is used which is cured by irradiation of an ultraviolet beam, and this radiation curable resin material is stored in a tank 31. The radiation curable resin material is supplied through a supply device 32 from the tank 31 to a coating head 35 of an extrusion type. The transparent sheet 33 wound around a backup roller 36 is coated with the resin liquid by the coating head 35.

Table 1 shows composition and physical properties of the resin liquid supplied to the coating head 35.

TABLE 1

| | Weight ratio |
|---|---|
| EB3700 | 60 |
| BPE200 | 20 |
| BR-31 | 100 |
| M-110 | 20 |
| MEK | 40 |
| Rate of content of MEK | 4 [%] |
| Coefficient of viscosity of liquid | 52 [mPa · s] |

The resin liquid used for this embodiment is provided by mixing compounds shown in Table 1 by a weight ratio described in Table 1 and heating at 50° C. to stir and melt, and after curing, it has the refractive index of 1.59. Names and physical properties of the compounds will be shown below.

| | |
|---|---|
| EB3700: | Ebcryl 3700, from Daicel-Cytec Company, LTD. bisphenol A type epoxy acrylate (coefficient of viscosity: 2,200 mPa · s/65° C.) |
| BPE200: | NK ester BPE-200, from Shin-Nakamura Chemical Co., LTD. ethylene oxide added bisphenol A methacrylic acid ester (coefficient of viscosity: 590 mPa · s/25° C.) |
| BR-31: | New Frontier BR-31, from Dai-Ichi Kogyo Seiyaku Co., LTD. tribromophenoxy ethyl acrylate (solid at the room temperature, melting point: not smaller than 50° C.) |
| M-110: | ARONICS M-110, from Toagosei Co., LTD. (meth) acrylate of p-cumylphenol having ethylene oxide reacted (coefficient of viscosity: 150 mPa · s/25° C.) |
| LR8893X: | Lucirin LR8893X, from BASF photo radical generator ethyl-2, 4, 6-trimethyl benzoyl ethoxyphenyl phosphine oxide |
| MEK: | methyl ethyl ketone |

The resin liquid prepared in this way is coated on the transparent sheet 33, and subsequently dried, forming the resin layer. Then, when the resin liquid is coated by the coating head 35, the supply device 32 controls a quantity of the resin liquid supplied to the coating head 35 so that a film thickness of the resin layer after dried is 20 μm.

The transparent sheet 33 coated with the resin liquid is fed to a drying device 37. The drying device 37 includes a drying equipment by hot air circulation and the temperature of the hot air is 100° C.

Subsequently, the transparent sheet 33 is sandwiched between a nip roller 38 and a concavo-convex roller 39 to form a desired concavo-convex pattern on the resin layer of the transparent sheet 33 in a press process. In addition, the concavo-convex pattern to be formed in the present embodiment is a prismatic, concavo-convex pattern having a triangular top portion and a triangular valley bottom portion.

The nip roller 38 used in this process has a diameter of 200 (mm) and a silicone rubber layer having a hardness of 90 formed on a surface thereof. Further, the concavo-convex roller 39 has a length of 700 mm in the width direction of the concavo-convex roller 39 (width direction of the sheet 33) and a diameter of 300 mm, and it is a roller manufactured of S45C with material of its surface being composed of nickel. Grooves in the width direction of the concavo-convex roller 39 with a pitch of 50 μm are formed in the entirely circumferential area having a width of about 500 mm on the surface of the concavo-convex roller 39. These grooves to be formed on the concavo-convex roller 39 were formed by a cutting work using a diamond tool (single point). In addition, after working the grooves, the surface of the concavo-convex roller 39 is nickel plated.

A cross-sectional shape to be formed in the grooves is triangular where a top portion has an apex angle of 90°, and a valley bottom portion also is triangular with no flat portions and has an groove angle of 90°. A groove width, i.e. a cycle of the grooves is 50 (μm), a groove depth is about 25 (μm), and these grooves are formed seamlessly and endlessly on the entire circumference of the concavo-convex roller 39.

The transparent sheet 33 is sandwiched between the nip roller 38 and the concavo-convex roller 39 to be shaped into a prism sheet (lenticular lens) having a triangular cross-section, and nip pressure (effective nip pressure) at this time by which the concavo-convex roller 39 and the nip roller 38 press the transparent sheet 33 is 0.5 (Pa).

Subsequently, the transparent sheet 33 wound around the concavo-convex roller 39, on which the prismatic concavo-convex pattern is later formed, is irradiated with an ultraviolet beam, i.e. a radiation beam by a resin curing device 40. The resin curing device 40 includes a metal halide lamp and is irradiated with an ultraviolet beam having energy of 1,000 (mJ/cm$^2$). Further, after the transparent sheet 33 is peeled off from the concavo-convex roller, a radiation beam may be again irradiated to promote curing.

A prism sheet 63 formed in this way is fed though a roller 41, 42 and 43, and subsequently coated and irradiated with an ultraviolet beam, and thereby, resin material is buried in the valley bottom portion of the prismatic, concavo-convex pattern in the prism sheet 63.

This resin material used for being buried is radiation curable resin material to be cured by irradiation of an ultraviolet beam similar to the aforementioned material. Resin liquid composed of this radiation curable resin material is stored in a tank 44 and fed to a coating head 46 through a supply device 45. In a coating process, with the prism sheet 63 being wound around a backup roller 47, the resin liquid is coated by the coating head 46 on the surface on which the prismatic, concavo-convex pattern is formed. Subsequently, the resin liquid is dried by a drying device 48, and the drying conditions are the same as the aforementioned.

Subsequently, the prism sheet 63 is fed to resin curing equipment 49 which performs a radiation irradiation process. In the radiation irradiation process, the prism sheet 63 is irradiated with an ultraviolet beam, i.e. a radiation beam by a resin curing device 51, with the prism sheet 63 being wound around a roller 50 provided in the resin curing equipment 49, and then the resin liquid coated by the coating head 46 is cured to form the resin portion 22. In addition, in the present embodiment, the ultraviolet beam is irradiated with the transparent sheet 33 being wound around the roller 50 in the resin curing equipment 49, but depending on a shape in which the resin portion 22 is buried, the curing may be performed without usage of the roller 50. According to the processes described above, the optical sheet 23 is completed.

The completed optical sheet 23 is fed to a sheet rewinding device 52 including a roller, and a protective film 54 supplied by a protective film supply device 53 is adhered to the surface of the optical sheet 23 on which the concavo-convex pattern is formed, and then, the optical sheet 23 overlapped with the protective film 54 by a roller 55 is rewound by the sheet rewinding device 52.

[Measurement and Evaluation of Optical Film]

Experiments in which parameters of manufacturing conditions etc. were changed were performed using the manufacturing equipment of the optical film described above. Specifically, as shown in Table 2, the optical films were manufactured under varying conditions of the refractive index of each base material (concavo-convex member sheet), the refractive index of the resin material used for being buried, and a height at which the resin material is buried, and then, occurrence or nonoccurrence of the sidelobe was observed and the front luminance was measured.

TABLE 2

| | Refractive index of base material | Refractive index of resin | Buried height | Sidelobe | Front luminance |
|---|---|---|---|---|---|
| Example 1 | 1.59 | 1.59 | 1/3 | Nonoccurrence | 9700 [cd/m$^2$] |
| Example 2 | 1.59 | 1.59 | 1/2 | Nonoccurrence | 9500 [cd/m$^2$] |
| Example 3 | 1.59 | 1.59 | 2/3 | Nonoccurrence | 7700 [cd/m$^2$] |
| Example 4 | 1.59 | 2 | 1/3 | Nonoccurrence | 10400 [cd/m$^2$] |
| Example 5 | 1.59 | 2 | 1/2 | Nonoccurrence | 9800 [cd/m$^2$] |
| Comparative Example 1 | 1.59 | — | 0 | Occurrence | 10000 [cd/m$^2$] |

Figure 1:
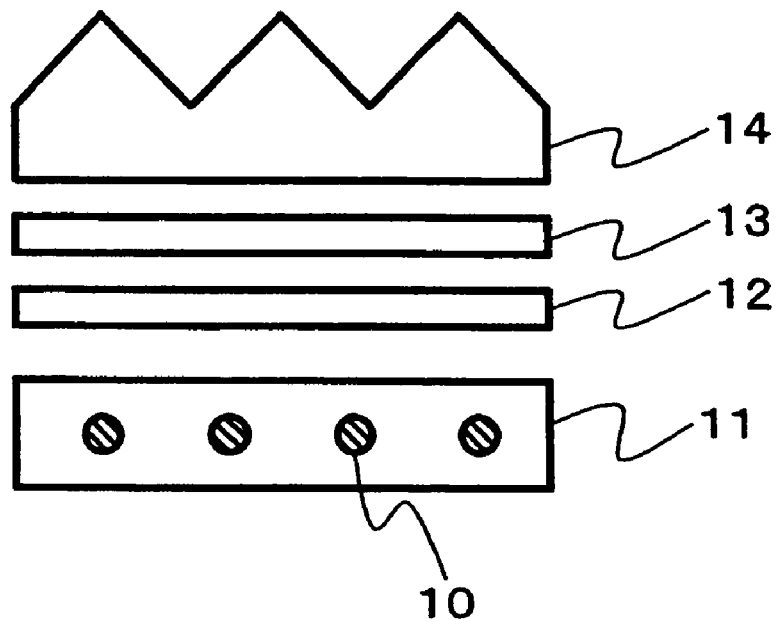
FIG. 1 is a cross-section view of a backlight for a conventional planar display.

Evaluation was performed, in the conventional prism sheet without the buried portion as shown in FIG. 1, under conditions that a light source including a cold-cathode tube, a light guiding plate and the like was disposed on the side of the surface on which the concavo-convex pattern was not formed, and electric current flowing through the cold-cathode tube was adjusted so that the front luminance on the side of the surface of the prism sheet on which the concavo-convex pattern was formed, i.e. the luminance at the field of view of 0° (luminous intensity received by a photodetector which is measurement equipment) was 10,000 (cd/m$^2$). In these conditions, using the photodetector, which was the measurement equipment, the luminance at the field of view from 0° to 90° was measured and evaluated. Evaluation items were occurrence or nonoccurrence of the sidelobe and the front luminance at the field of view of 0°.

Table 2 shows the manufacturing conditions and the evaluation result of the optical sheets 23 manufactured by the manufacturing equipment of the optical sheet described above. In addition, the buried height of the resin material to be buried, as shown in FIG. 4, is shown by a ratio of a height S of the resin to be buried from the valley bottom, i.e. the concave portion, against a difference of elevation P between a tip, i.e. the convex portion and the valley bottom, i.e. the concave portion in the prismatic, concavo-convex pattern of the prism sheet 21 (the same prism sheet as the prism sheet 63 as described concerning the manufacturing equipment of the optical sheet above).

A first example is the case such that the refractive index of the prism sheet 21 used for a base for manufacturing the optical sheet 23 according to the present invention is 1.59, and the refractive index of the resin material coated by the coating head 46 for forming the resin portion 22 is 1.59, and the buried height is ⅓. In the optical sheet 23 formed under these conditions, occurrence of the sidelobe was not confirmed, the front luminance was 9,700 (cd/m$^2$), and therefore the front luminance was scarcely decreased.

A second example is the case such that the refractive index of the prism sheet 21 used for a base for manufacturing the optical sheet 23 according to the present invention is 1.59, and the refractive index of the resin material coated by the coating head 46 for forming the resin portion 22 is 1.59, and the buried height is ½. In the optical sheet 23 formed under these conditions, occurrence of the sidelobe was not confirmed, the front luminance was 9,500 (cd/m$^2$), and therefore a decrease in the front luminance was small.

A third example is the case such that the refractive index of the prism sheet 21 used for a base for manufacturing the optical sheet 23 according to the present invention is 1.59, and the refractive index of the resin material coated by the coating head 46 for forming the resin portion 22 is 1.59, and the buried height is ⅔. In the optical sheet 23 formed under these conditions, occurrence of the sidelobe was not confirmed, and the front luminance was 7,700 (cd/m$^2$).

A fourth example is the case such that the refractive index of the prism sheet 21 used for a base for manufacturing the optical sheet 23 according to the present invention is 1.59, and the refractive index of the resin material coated by the coating head 46 for forming the resin portion 22 is 2, and the buried height is ⅓. In the optical sheet 23 formed under these conditions, occurrence of the sidelobe was not confirmed, the front luminance was 10,400 (cd/m$^2$), and therefore an increase in the front luminance was confirmed.

A fifth example is the case such that the refractive index of the prism sheet 21 used for a base for manufacturing the optical sheet 23 according to the present invention is 1.59, and the refractive index of the resin material coated by the coating head 46 for forming the resin portion 22 is 2, and the buried height is ½. In the optical sheet 23 formed under these conditions, occurrence of the sidelobe was not confirmed, the front luminance also was 9,800 (cd/m$^2$), and therefore the front luminance exhibited few decrease.

A first comparative example is the conventional prism sheet which is the optical sheet 14 with the resin not being buried as shown in FIG. 1, and this prism sheet has the refractive index of 1.59. In this prism sheet, occurrence of the sidelobe was confirmed, and the front luminance was 10,000 (cd/m$^2$).

From the result above, when only the prism sheet is present, i.e. in the case of the first comparative example which is conventional, the occurrence of the sidelobe is confirmed, but in the cases of the optical sheets 23 of the first to fifth examples according to the present invention, the occurrence of the sidelobe was not confirmed, and therefore it was confirmed that, in the optical sheets 23 according to the present invention, the sidelobe can be eliminated.

Further, when the buried height to which the resin material to be buried is buried for forming the resin portion 22 is not larger than ½ as shown in the first and second examples, because the front luminance has few decrease, the sidelobe can be eliminated while controlling a decrease in the front luminance. However, when the buried height is ⅔ as shown in the third example, the decrease in the front luminance is shown. Therefore, in order to eliminate the sidelobe while preventing the front luminance from being decreased, it is desired that the buried height is not larger than ½. This is also shown in FIG. 8 described below, and when the refractive index of the resin material for forming the resin portion 22 is different from that of the material for forming the prism sheet 21, that is, in the case of the fourth and fifth examples, similar tendency is also shown.

On the contrary, in the case of the fourth example, not only the sidelobe is eliminated, but the front luminance is improved. Therefore, by optimizing a value of the refractive index of the buried resin material for forming the resin portion 22 and the buried height of the resin portion 22, the sidelobe can be eliminated and also the front luminance can be enhanced.

From the viewpoints described above, we studied relation between the refractive index of the resin portion 22 to be buried and a relative quantity of light in the front in the cases of the buried height of ⅓, ⅔ and 1. The result is shown in FIG. 8. In addition, the refractive index of the material for forming the prism sheet 21 to be base material, on which the prismatic, concavo-convex pattern is formed, is 1.6, and further, the relative quantity of light in the front is correlated with the front luminance, and therefore, as the relative quantity of light raised, the front luminance is increased.

Figure 8:
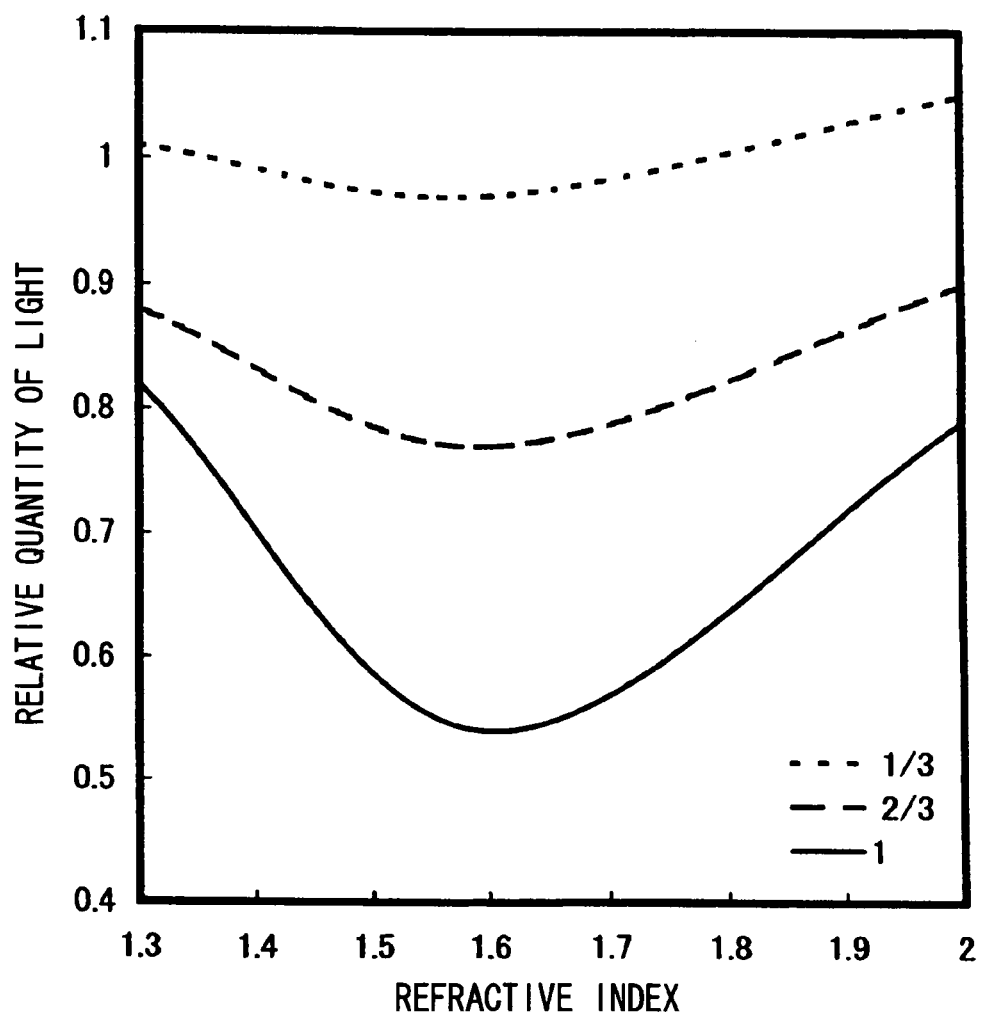
FIG. 8 is a schematic diagram illustrating correlation between a refractive index of buried material and a relative quantity of light in an optical sheet according to the present invention.

As shown in FIG. 8, it is proved that, as the buried height of the resin portion 22 to be buried is increased, the relative quantity of light is decreased, and therefore the front luminance is decreased, as described above. Moreover, when the resin portion 22 is buried using material having the refractive index of a different value from that of the refractive index of the material for forming the prism sheet 21 to be the base material, the relative quantity of light is less decreased, and according to circumstances, the relative quantity of light is increased.

As remarked above, the value of the refractive index and the buried height of the resin portion 22 to be buried have a large effect on the optical sheet 23 according to the present invention, and by optimization of them, the sidelobe can be eliminated and also the front luminance can be improved.

[Backlight and Liquid Crystal Display]

Figure 9:
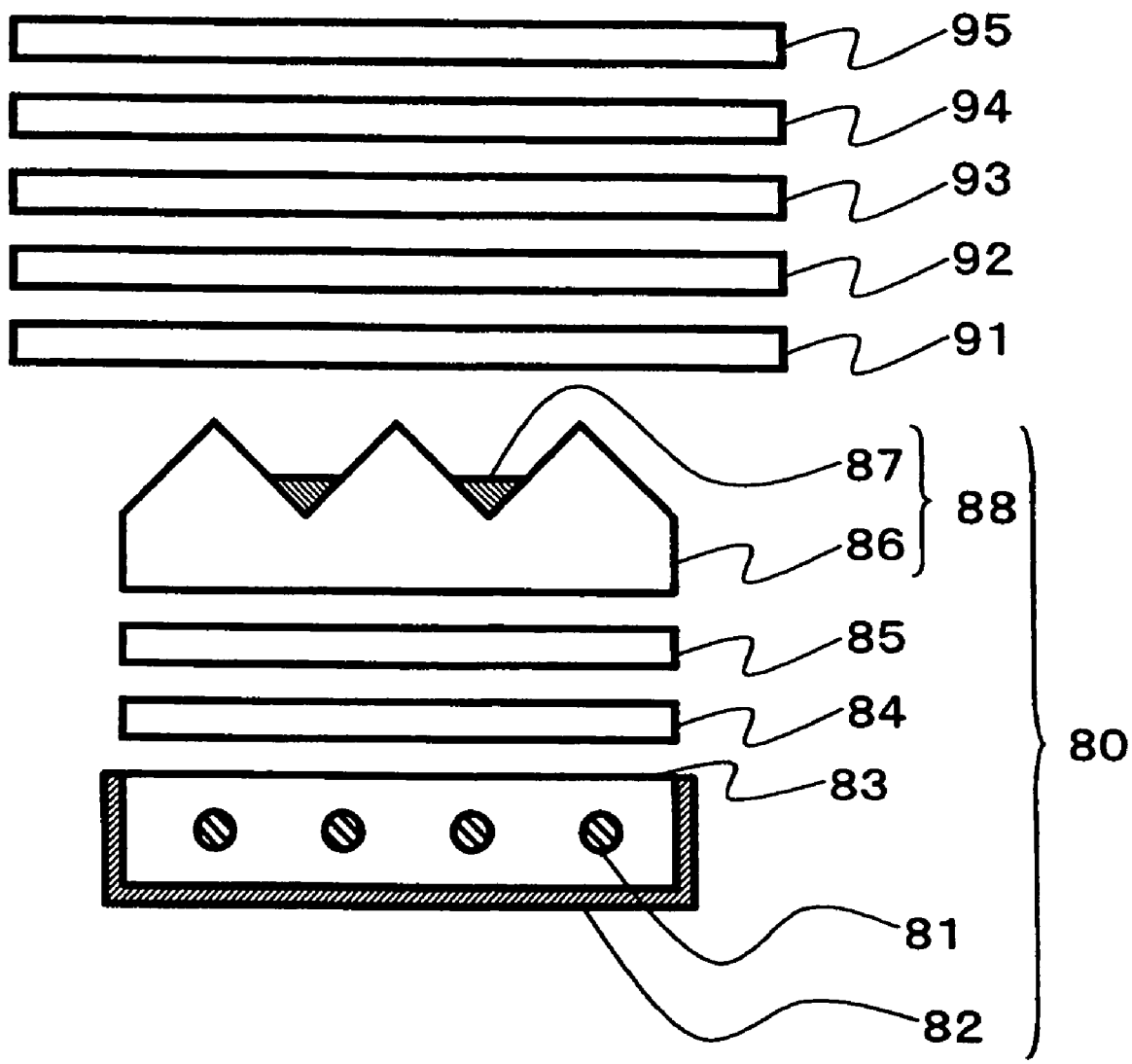
FIG. 9 is a cross-section view of a liquid crystal display according to the present invention.

Next, a backlight and a liquid crystal display using the optical sheet described above will be described with reference to FIG. 9.

A backlight 80 according to the present invention includes a light source 83 having a cold-cathode tube 81 and a reflecting plate 82, a diffusing plate 84, a diffusing sheet 85, and an optical sheet 86 (the same sheet as the optical sheet 23 described above).

The light source 83 is configured so that a light beam emitted from the cold-cathode tube 81 is emitted from one of surfaces of the light source 83 by the reflecting plate 82. That is, the light source 83 is configured to have the reflecting plate formed on its surface opposing to the emitting surface, emitting a stronger light beam from one of surfaces of the light source 83. The light beam in plane emission emitted from the light source 83 is diffused by the diffusing plate 84 and the diffusing sheet 85, and subsequently, it enters the optical sheet 86. The optical sheet 86 is provided by forming a resin portion 88 composed of material having the refractive index of 2 in a valley bottom, i.e. a concave portion on a prism sheet 87 composed of material having the refractive index of 1.6, on which a prismatic, concavo-convex pattern is formed, and a light beam having high front luminance and a wide field of view without the sidelobe is emitted.

Due to using the light beam emitted from the backlight 80 configured in this way to irradiate a liquid crystal panel from behind, a liquid crystal display having high visibility can be provided. Specifically, the liquid crystal display according to the present invention is configured in a manner that a polarizing film 91, a liquid crystal cell 92, a color filter 93, an adjusting film of field of view 94, and a protective film 95 are laminated on the emitting side of the backlight 80.

This liquid crystal display has a wide field of view and no sidelobes, and also has the front luminance higher by 4 (%) compared to that of a conventional liquid crystal display.

Second Embodiment

Figure 10:
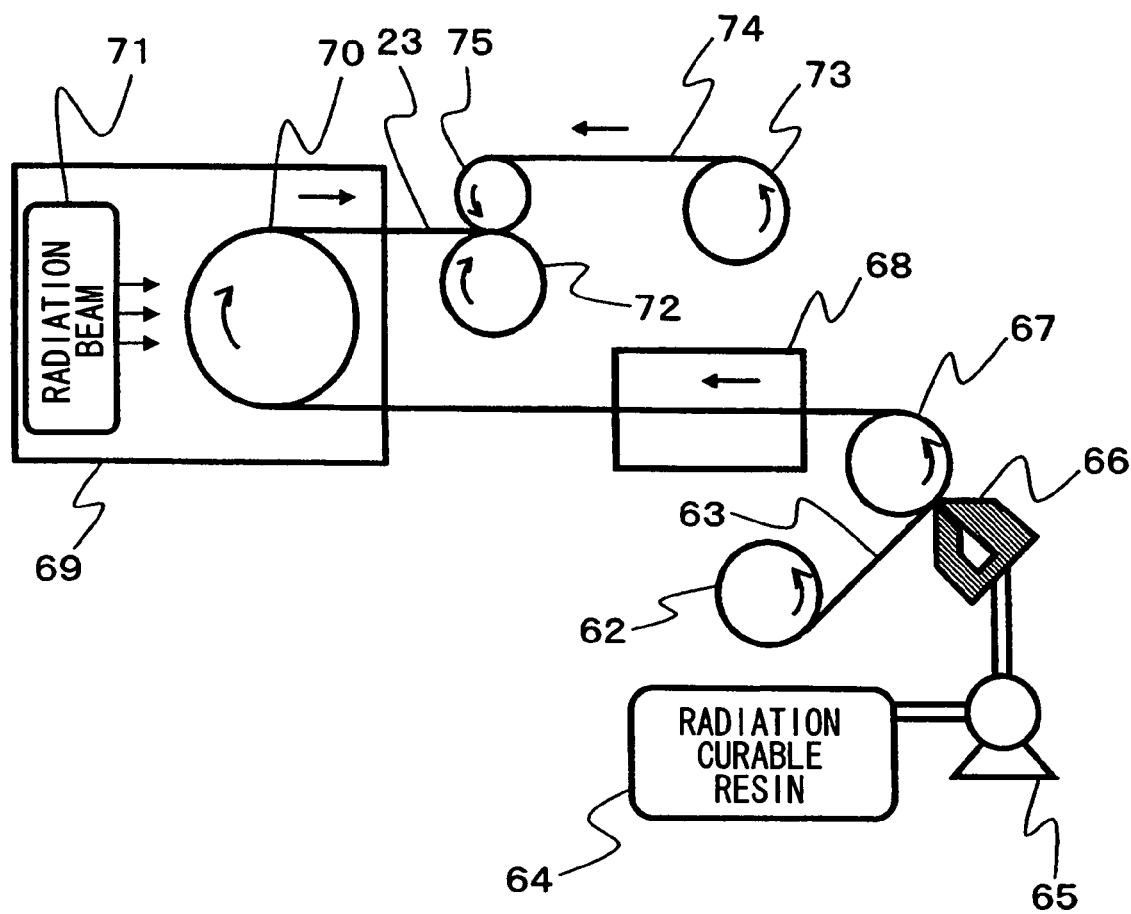
FIG. 10 is a schematic diagram illustrating a configuration of another manufacturing equipment of an optical sheet according to a second embodiment of the present invention.

A second embodiment is a method for manufacturing an optical sheet 23 by using the prism sheet 63 on which a prismatic, concavo-convex pattern was already formed, upon manufacturing of the optical sheet 23 according to the present invention. Specifically, the method will be described based on manufacturing equipment of the optical sheet 23 shown in FIG. 10.

A prism sheet 63 is wound around a roller 62 and it is fed to a coating head 66 and a backup roller 67 to bury resin material in a valley bottom portion on a surface of the prism sheet 63 on which a concavo-convex portion is formed. An end of the coating head 66 coats the prism sheet 63 with resin liquid composed of radiation curable resin material which is cured by irradiation of an ultraviolet beam. The resin liquid composed of this radiation curable resin material is stored in a tank 64, and supplied to the coating head 66 through a supply device 65. The coating of the resin liquid in a coating process is performed by coating, with the resin liquid, by the coating head 66, the surface on which the prismatic, concavo-convex pattern is formed, with the prism sheet 63 being wound around the backup roller 67. Subsequently, the resin liquid is dried by a drying device 68. Drying conditions etc. in the drying device 68 are the same as the first embodiment.

Subsequently, the prism sheet 63 is fed to resin curing equipment 69 where a radiation irradiation process is performed. In the radiation irradiation process, the prism sheet 63 wound around a roller 70 provided in the resin curing equipment 69 is irradiated with an ultraviolet beam, i.e. a radiation beam by a resin curing device 71 to cure the resin liquid coated by the coating head 66, forming the resin portion. In addition, in the present embodiment, in the resin curing equipment 69, the prism sheet 63 wound around the roller 70 is irradiated with an ultraviolet beam, but depending on a shape in which the resin liquid is buried, the resin liquid may be cured without usage of the roller 70. According to the processes described above, the optical sheet 23 according to the present invention is manufactured.

The optical sheet 23 manufactured in this way is fed to a sheet rewinding device 72 including a roller, and a protective film 74 supplied by a protective film supply device 73 is adhered to the surface of the optical sheet 23 on which the concavo-convex pattern is formed, and the optical sheet 23 is rewound by the sheet rewinding device 72, with the protective film 74 being laid on top of the optical sheet 23 by a roller 75.

Until now, the case of using the prism sheet in which the prismatic, concavo-convex pattern having the triangular convex portion and the triangular concave portion is arranged alternately in a generally parallel array has been described, but the case of using a sheet having a configuration in which a quadrangular pyramid-shaped convex portion and an inverted quadrangular pyramid-shaped concave portion are arranged alternately has also similar tendency, and the optical sheet according to the present invention can be manufactured by using the sheet having the configuration in which the quadrangular pyramid-shaped convex portion and the inverted quadrangular pyramid-shaped concave portion are arranged alternately.

The optical sheet according to the present invention described in connection with the embodiments can also be used to improve the luminance of not only a liquid crystal display, but a self-luminous panel such as an organic EL panel.

As describe above, the optical sheet, the manufacturing method of the optical sheet, the backlight and the liquid crystal display according to the present invention have been described in detail, but the present invention is not limited to these examples, and various improvements and modifications may be made thereto within the range without departing the points of the present invention.

What is claimed is:

1. An optical sheet composed of transmissive material, comprising:
    one generally planar surface; and
    the other surface on which a concavo-convex pattern formed of a convex portion having a triangular top portion and a concave portion of a surface parallel to the one generally planar surface of the optical sheet is formed alternately in a generally parallel array, wherein
    the triangular top portion is formed in a shape of an isosceles triangle having a base parallel to the one generally planar surface, and
    the triangular top portion has a basic angle in a range of 40 to 45 degree, wherein the concave portion is formed by filling, with transmissive resin material, a triangular valley bottom portion formed alternately with the triangular top portion in a generally parallel array; wherein the concavo-convex pattern before the filling of the transmissive resin material is a prismatic concavo-convex pattern; and wherein a buried height of the transmissive resin material with which the concave portion in the prismatic concavo-convex pattern is filled, from the valley bottom of the concave portion in the prismatic convaco-convex pattern.

2. A backlight, wherein
a light source is disposed on the opposing side to the surface of the optical sheet according to claim 1 on which the concavo-convex pattern is formed.

3. A liquid crystal display, wherein
a light source is disposed on the opposing side to the surface of the optical sheet according to claim 1 on which the concavo-convex pattern is formed, and
a liquid crystal panel is disposed on the side of the surface of the optical sheet on which the concavo-convex pattern is formed.

4. The optical sheet according to claim 1, wherein
the triangular top portion has an apex angle in a range of 90 to 100 degree.

5. The optical sheet according to claim 1, wherein
a value of refractive index of the transmissive resin material is different from that of refractive index of a material constituting the prismatic concavo-convex pattern.

6. The optical sheet according to claim 1, wherein the basic angle is an angle formed a line forming the base of the isosceles triangle and an adjacent leg of the triangle.

* * * * *

UNITED STATES PATENT AND TRADEMARK OFFICE
CERTIFICATE OF CORRECTION

| | |
|---|---|
| PATENT NO. | : 7,719,635 B2 |
| APPLICATION NO. | : 11/812569 |
| DATED | : May 18, 2010 |
| INVENTOR(S) | : Ryuichi Katsumoto et al. |

It is certified that error appears in the above-identified patent and that said Letters Patent is hereby corrected as shown below:

Col. 18, line 66, between "portion" and "in", insert --is not greater than half of a difference of elevation between a tip of the convex portion and the valley bottom of the concave portion--.

Signed and Sealed this
Twelfth Day of July, 2011

David J. Kappos
*Director of the United States Patent and Trademark Office*